(12) United States Patent
Dalecký et al.

(10) Patent No.: US 10,616,637 B2
(45) Date of Patent: Apr. 7, 2020

(54) DIGITAL RADIO FREQUENCY SIGNAL DISTRIBUTION SYSTEM

(71) Applicant: UNITRON NV, Poperinge (BE)

(72) Inventors: Roman Dalecký, Pardubice (CZ); Ladislav Jarkovský, Castolovice (CZ); Stephen Deleu, Beervelde (BE)

(73) Assignee: UNITRON NV, Poperinge (BE)

( * ) Notice: Subject to any disclaimer, the term of this patent is extended or adjusted under 35 U.S.C. 154(b) by 0 days.

(21) Appl. No.: 16/306,617

(22) PCT Filed: May 17, 2017

(86) PCT No.: PCT/EP2017/061821
§ 371 (c)(1),
(2) Date: Dec. 3, 2018

(87) PCT Pub. No.: WO2017/207274
PCT Pub. Date: Dec. 7, 2017

(65) Prior Publication Data
US 2019/0230404 A1  Jul. 25, 2019

(30) Foreign Application Priority Data
Jun. 3, 2016 (EP) .................................. 16172871

(51) Int. Cl.
*H04K 1/10* (2006.01)
*H04N 21/426* (2011.01)
*H04N 7/12* (2006.01)

(52) U.S. Cl.
CPC ......... *H04N 21/42607* (2013.01); *H04N 7/12* (2013.01)

(58) Field of Classification Search
CPC ...................................................... H04K 1/10
USPC ....................................................... 375/260
See application file for complete search history.

(56) References Cited

U.S. PATENT DOCUMENTS 7,675,985 B1    3/2010  Watson
8,254,481 B1 *  8/2012  McCloskey .............. H04K 1/10
                                                    375/260

(Continued)

FOREIGN PATENT DOCUMENTS

EP    2393226 A1   12/2011
EP    2728770 A2    5/2014

(Continued)

OTHER PUBLICATIONS

"Broadcom Expands Low-power ODU Satellite Device Portfolio," retrieved from https://technuter.com/electronics/broadcom-expands-low-power-odu-satellite-device-portfolio.html, Jan. 7, 2015, 4 Pages.

(Continued)

*Primary Examiner* — Mushfikh I Alam
(74) *Attorney, Agent, or Firm* — Workman Nydegger

(57) ABSTRACT

There is disclosed a system configured to receive one or more radio frequency signals comprising a UHF frequency range comprising a plurality of UHF channels. The system comprises: one or more corresponding analog to digital converters, configured to convert the corresponding RF signal after which a digital multi-switch module and a corresponding plurality of digital channelizers generate modified digital RF signals preferably comprising a digital signal comprising at least one selected, frequency translated and leveled UHF channel.

15 Claims, 3 Drawing Sheets

(56) References Cited

U.S. PATENT DOCUMENTS

| | | | |
|---|---|---|---|
| 8,345,798 | B2 | 1/2013 | Petrovic et al. |
| 8,514,986 | B2* | 8/2013 | Gupta .................... H04B 1/109 |
| | | | 375/343 |
| 9,247,274 | B2 | 1/2016 | Ramesh et al. |
| 2012/0163290 | A1 | 6/2012 | Krafft et al. |
| 2016/0087335 | A1* | 3/2016 | Marr ........................ H01Q 3/00 |
| | | | 342/368 |
| 2016/0245923 | A1* | 8/2016 | Badke ..................... G01S 19/32 |
| 2018/0102926 | A1* | 4/2018 | Marr ......................... H04L 5/06 |
| 2019/0097662 | A1* | 3/2019 | Hornbuckle ......... H04B 1/0057 |
| 2019/0288785 | A1* | 9/2019 | Wojtunik ............... H04B 10/25 |

FOREIGN PATENT DOCUMENTS

| | | |
|---|---|---|
| EP | 3113371 A1 | 1/2017 |
| EP | 3157263 A1 | 4/2017 |
| WO | 2009143082 A1 | 11/2009 |
| WO | 2010121261 A1 | 10/2010 |

OTHER PUBLICATIONS

Gao et al., "A Digital Single-Wire Multiswitch (DSWM) Channel-Stacking IC in 45nm CMOS for Satellite Outdoor Units," IEEE International Solid-State Circuits Conference, Session 13, 2013, pp. 244-246.

Janssen et al., "Chapter 4 GS/s AD Conversion for Broadband Multi-stream Reception," Nyquist AD Converters, Sensor Interfaces, and Robustness: Advances in Analog Circuit Design, 2012, pp. 51-54.

"TDA20100 Digital Satellite Channel Stacking IC Data Sheet," NXP, Aug. 2012, 14 Pages.

Sanchez et al., "Design and Implementation of a Direct RF-to-Digital UHF-TV Multichannel Transceiver," Proceedings of 2010 IEEE International Symposium on Circuits and Systems, 2010, pp. 3925-3928.

"SAT-32," Lem Elettronica, Jun. 9, 2015, 4 Pages.

Wang et al., "Modeling of a Multiple Digital Automatic Gain Control System," Tsinghua Science and Technology, vol. 13, No. 6, Dec. 2008, pp. 807-811.

Extended European Search Report from EP Application No. 16172871.2, dated Nov. 17, 2016.

International Search Report and Written Opinion from PCT Application No. PCT/EP2017/061821, dated Jul. 14, 2017.

Third Party Observation for Application No. EP 20160172871, Jun. 20, 2018.

Third Party Observation for Application No. EP 20160172871, Oct. 17, 2018.

Third Party Observation for Application No. EP 20160172871, Nov. 23, 2018.

* cited by examiner

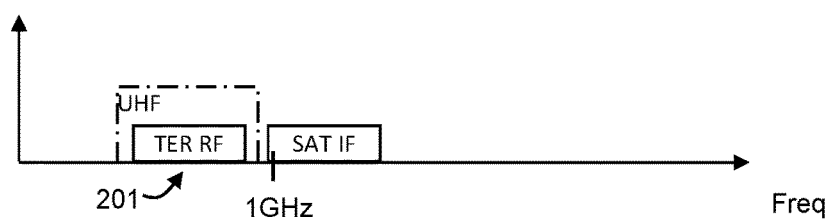
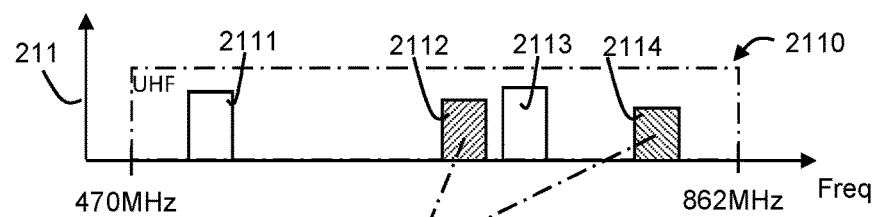
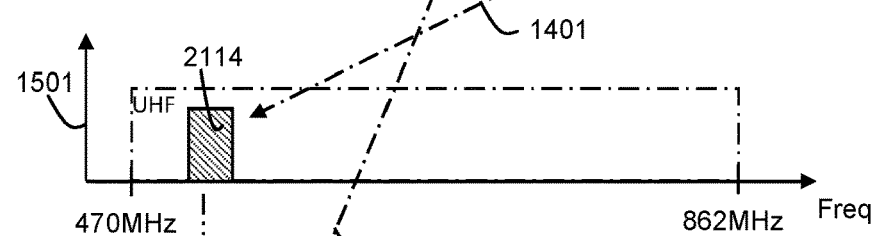
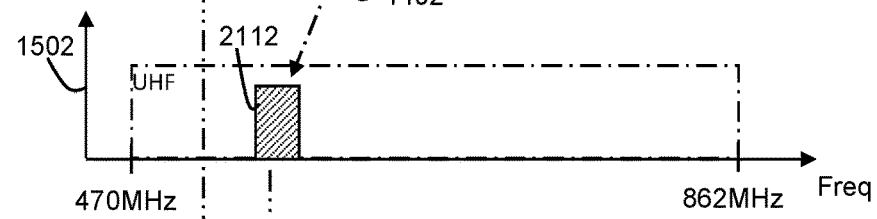
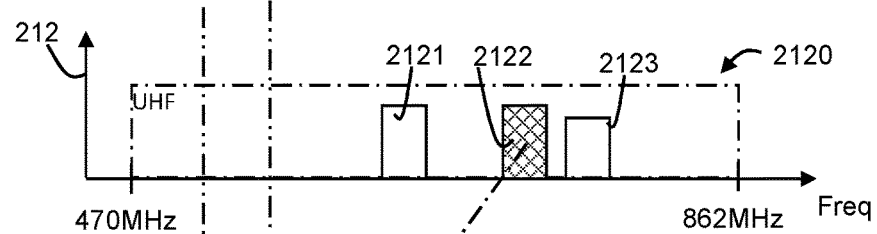
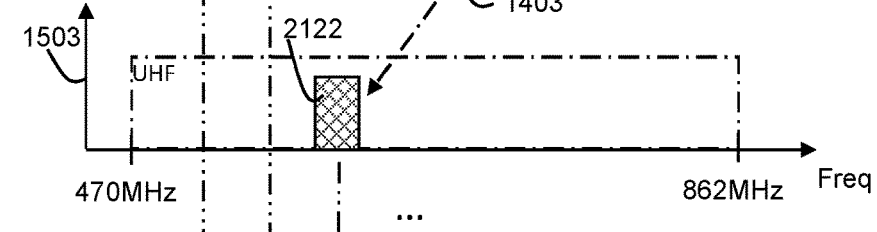
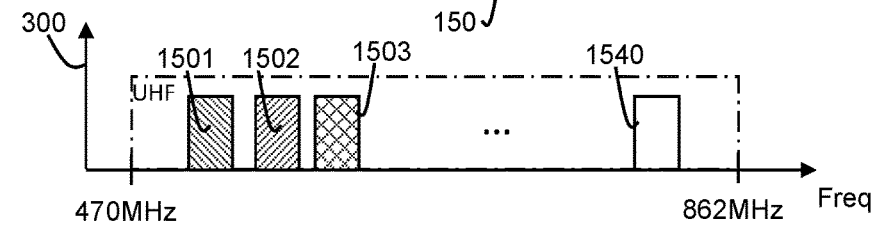

DIGITAL RADIO FREQUENCY SIGNAL DISTRIBUTION SYSTEM

TECHNICAL FIELD

The present invention generally relates to the field of radio frequency signal distribution systems. More particularly to distribution of UHF signals such as for example terrestrial television or Digital Video Broadcast signals.

BACKGROUND

In the domain of radio frequency or RF signals such as terrestrial RF signals for analog or digital television channel broadcast systems, which for example comprise a UHF frequency range with a plurality of UHF channels at different frequencies, It is generally known, for example from EP2393226 that such frequency channels of such a frequency range are each received at different power levels. The broadcasting power, transmission distance, signal interference, etc. might considerably vary for different terrestrial broadcasting stations, of which a terrestrial antenna receives such an RF signal. When, for example in television distribution systems, transceiver systems were used that equally amplified the entire frequency range in which the plurality of channels are transmitted, for example the entire UHF frequency range, this would lead to undesired variations in the power level of different frequency channels in the output signal.

In order to solve this problem, transceiver systems are for example known from EP2393226 to individually amplify each frequency channel from the frequency range of the RF signal. EP2393226 discloses a television channel amplification system in which a single analog RF input signal received from an antenna is split by means of a power divider, in such a way that this single analog RF input signal is received by a plurality of transceiver modules. The power divider thus must ensure that this single analog input signal reaches all the transceiver modules. Each such transceiver module comprises an analog filter which selects from this received analog input signal a subset of M channels. It is clear that preferably each transceiver module operates preferably on a different subset of channels from the analog input signal and each transceiver module thus preferably comprises a different filter for the analog RF input signal received by it. According to an embodiment referred to as direct RF digitization, the filtered analog RF signal comprising this particular subset of M channels is then digitized by means of an ADC, amplification is then performed digitally by means of the transceiver modules, and subsequently the amplified signal is again converted to an analog signal by means of a DAC. It is thus clear that each transceiver module thus requires a corresponding ADC and DAC. The outputs of the plurality transceiver modules are then combined in an output signal. A further prior art system is known from EP2728770, which discloses a satellite transponder with a system and a method for processing communication data by analog to digital conversion of the signals, formation of frequency channels and combination of them by a switch with a plurality of stages.

However the system known from EP2393226 presents some problems with respect to scalability and flexibility, especially when coping with a plurality of RF signals. According to the system of EP239226 each RF signal requires a separate transceiver system in which a power splitter splits the RF signal to a plurality of transceiver modules which each comprise a suitably configured filter for the desired selection of a subset of frequency channels. Additionally, as this power splitter and filter operate on the analog RF signal this leads to a complex, inflexible design, and noise inducing components in the analog RF signal path. Further also the system known from EP2728770, in a similar way lacks flexibility, especially when coping with a plurality of RF-signals, as each RF signal requires a separate transceiver system.

Additionally, as pointed out in EP2393226 in paragraph [0032], it is clear for a person skilled in the art that it is very important to optimally adjust the dynamic range of the analog signal comprising the filtered subset of frequency channels to the ADC of each transceiver module, before conversion to the digital domain. As further stated, a person skilled in the art would therefor require, for each transceiver module, a variable gain amplifier in the signal path of the analog signal, which comprises the filtered subset of frequency channels, in order to deliver at all times the same power to the ADC to be included in all the implementations of such a system. It is thus clear that in this way a person skilled in the art, next to the power splitter and filter, would also require such an analog automatic gain control component for each transceiver module.

Therefor there still exists a need for such a system, which is able to handle such terrestrial RF signals with a plurality of frequency channels with large differences in their power level, in a more flexible, simple and efficient way, with a reduced risk for noise induction in the analog RF signal path. There is particularly a need for a more flexible, simple and efficient system for handling a plurality of such RF signals.

SUMMARY

According to a first aspect of the invention, there is provided a system configured to receive, from one or more antennas, one or more radio frequency (RF) signals comprising a UHF frequency range comprising a plurality of UHF channels, the system comprising:
  one or more corresponding analog to digital converters (ADC) configured to receive said one or more RF signals such that any of the RF signals is only received by a single ADC, each ADC configured to convert the corresponding RF signal to a digitized RF signal such that it comprises a digitized UHF frequency range comprising a plurality of digitized frequency channels corresponding to a plurality of the UHF channels;
  a digital multi-switch module comprising:
    one or more corresponding multi-switch inputs each coupled to a corresponding ADC and configured to receive a corresponding digitized RF signal; and
    a plurality of multi-switch outputs, each configured to be selectively coupled to a selected multi-switch input to output the corresponding selected digitized RF signal;
    a plurality of digital channelizers, each digital channelizer coupled to a single multi-switch output and configured to digitally modify the selected digitized RF signal to a modified digital RF signal.

In this way a less complex and more flexible system is provided as each of the plurality of digital channelizers does not need to be provided with an ADC. As each RF signal is received by a single ADC, it is clear that for embodiments with only one RF signal even a single ADC could suffice and when a plurality of RF signals need to be handled the number of ADCs does not need to exceed the number of RF signals. Additional flexibility and simplicity is further especially provided for embodiments in which a plurality of RF signals are received by the system, as the digital multiswitch module allows the plurality of digital channelizers to be selectively used for each the plurality of RF signals in a shared way. Additionally surprisingly, contrary to the beliefs of the skilled person, by digitizing each RF signal without making use of a power splitter, a filter for selecting a small subset comprising a limited number of frequency channels and a corresponding analog automatic gain control component in the analog signal path, still a suitably functioning system is realized as the analog signal path and the number of noise inducing components in the signal path of each RF signal before it is digitized by a single ADC is reduced to an absolute minimum, even in case of RF signals comprising a UHF frequency range with a plurality of UHF channels with a large differences in their respective power levels. Still further efficiency of the system is increased as each RF signal is only received by a single ADC, there reducing the processing power and power consumption related to digitisation of each RF signal. The digital multi-switch module and plurality of digital channelizers, which can preferably be integrated in a digital processing module of an integrated circuit, can for example be largely software defined, which allows for a high level of flexibility during design and configuration of the system.

According to an embodiment there is provided a system, characterised in that:
the one or more RF signals further comprise a terrestrial RF signal comprising a frequency range below 1 GHz comprising a plurality of frequency channels with a bandwidth below 10 MHz; and in that
each ADC is configured to convert the corresponding RF signal to a digitized RF signal such that it further comprises a plurality of digitized frequency channels corresponding to a plurality of said frequency channels with a bandwidth below 10 MHz;
the terrestrial RF signal preferably comprising one or more of the following:
  a terrestrial VHF signal;
  a terrestrial UHF signal;
  a terrestrial video broadcast signal;
  a terrestrial television broadcast signal;
  a terrestrial digital video broadcast signal;
  a DVB-T or DVT-T2 signal.

Although the system is particularly preferred when handling one or more RF signals comprising an UHF frequency range comprising a plurality of UHF channels which can have large differences in the respective power levels of the different UHF channels, such as for example UHF channels used for terrestrial broadcasting of analog or digital television broadcast channels, it is clear that the system is also useable for handling any such similar terrestrial RF signal, typically with a frequency range below 1 GHz and comprising frequency channels with a bandwidth below 10 MHz in which similar variations in power levels between different frequency channels could occur. Such an terrestrial RF signal could thus comprise a plurality of frequency channels, which next to a plurality of UHF channels also comprises a plurality of VHF channels or other similar frequency channels, such as for example in use for terrestrial analog or digital television broadcasting.

According to a further embodiment there is provided a system, characterised in that each of the plurality of digital channelizers is configured to modify the selected digitized RF signal such that the modified digital RF signal comprises one or more selected digitized frequency channels, selected from the plurality of digitized frequency channels of the selected digitized RF signal.

As not only the modification, but also the selection of the frequency channels is performed in the digital domain a particularly flexible and simple system is provided for.

According to a further embodiment there is provided system, characterised in that each of the plurality of digital channelizers is configured to modify the selected digitized RF signal such that the modified digital RF signal comprises a single selected digitized frequency channel, selected from the plurality of digitized frequency channels of the selected digitized RF signal.

According to this embodiment modifications performed by the digital channelizer, such as for example automatic gain control to a predetermined desired power level, can be performed in an optimized way for this particular frequency channel. This then for example allows each channelizer to set the level of its selected frequency channel, for example a selected UHF channel to the same desired power level, thereby individually equalizing the power levels of all these selected UHF channels.

According to a further embodiment there is provided system, characterised in that each of the plurality of digital channelizers is further configured to frequency translate its one or more selected digitized frequency channels.

In this way as frequency translation is performed in the digital domain, repositioning the selected frequency channels to a desired frequency in the frequency range can be performed in a flexible and efficient way.

According to a further embodiment there is provided system, characterised in that each of the plurality of digital channelizers is configured to subject its one or more selected digitized frequency channels to digital automatic gain control.

In this way individual amplification of the selected frequency channels in the digital domain is realized in a simple, flexible and efficient way.

According to a further embodiment there is provided system, characterised in that the system further comprises a digital signal combiner coupled to the plurality of digital channelizers such that the digital signal combiner receives the plurality of corresponding modified RF signals, the digital signal combiner configured to combine the plurality of modified digital RF signals into one or more combined modified digital RF output signals.

In this way one or more output signals can be combined in a flexible way in the digital domain, by means of the digital signal combiner, even allowing the digital channelizers to be selectively used in a shared way for a plurality of combined modified digital RF output signals in an efficient and flexible way.

According to a further embodiment there is provided system, characterised in that the system further comprises one or more digital to analog converters or DAC coupled to the digital signal combiner, and each configured to receive one combined modified digital RF output signal and convert it to a combined modified RF output signal.

No longer there is required a DAC for each of the channelizers. According to a particular simple embodiment with a single modified RF output signal, a single DAC could even suffice. In any case the number of DACs does not need to exceed the number of modified RF output signals.

According to a further embodiment there is provided system, characterised in that each combined modified RF output signal comprises a modified set of selected UHF channels from the one or more RF signals.

In this way preferably the combined modified RF output signal comprises the desired selection of UHF channels which each have been respectively amplified to the desired power levels and positioned a the desired frequency in the UHF frequency range in the digital domain by means of their respectively corresponding digital channelizer.

According to a further embodiment there is provided system, characterised in that the number of digital channelizers is larger than the number of ADCs.

In this way a simple and efficient system is realized in which the digital channelizers can be used in a shared way by each of the ADCs by means of the digital multi-switch module. Preferably also the number DACs is smaller than the number of digital channelizers. In this way for example 12 to 64 digital channelizers can be used in a shared way for for example 1 to 8 ADCs and 1 to 4 DACs. Thereby allowing for example 12 to 64 selected and modified frequency channels from any desired RF signal at the DACs to be present in the combined modified RF output signal generated by any of the DACs in a flexible and simple way.

According to a further embodiment there is provided system, characterised in that the digital multi-switch module is further configured such that each of the ADCs is selectively couplable to each of the plurality of digital channelizers by means of the digital multi-switch module.

In this way all digital channelizers are available for all ADCs in a shared way, thereby maximizing flexibility.

According to a further embodiment there is provided system, characterised in that the system further comprises one or more input connectors, each input connector configured to receive the RF signal from the antenna, and each input connector being coupled to only one ADC.

In this way a system with a simple setup and a reduced number of ADCs is provided for the number of ADC is less than or equal to the number of input connectors for RF signals and no longer an ADC for each channelizer is required.

According to a further embodiment there is provided system, characterised in that there is arranged in the signal path of the RF signal between the input connector and the corresponding ADC, one or more of the following:
 a filter;
 a low noise amplifier;
 an automatic gain control module.

As the RF signal does not need to be split to a plurality of channelizers, any such components in the analog signal paths between the input connector and the corresponding ADC need to be only provided once for each RF signal received by an ADC. This simplifies the system and increases flexibility as these components do not need to be tuned or configured in function of particular frequency channels to be selected and leveled for a particular channelizer. Such a filter low noise amplifier and/or automatic gain control module operate in a uniform way on all of the plurality of frequency channels of the frequency range of the RF signal received at the ADC.

According to a further embodiment there is provided system, characterised in that there is not arranged in the signal path of the terrestrial RF signal between the input connector and the corresponding ADC, one or more of the following:
 a power splitter configured to distribute a single terrestrial RF signal to two or more of the ADCs;
 a frequency translation module.

In this way, surprisingly and contrary to the beliefs of a skilled person, a workable and more flexible system is provided because of the reduced number of noise inducing components and length of the analog signal path of the analog RF signal between the input connectors and the ADCs, even when handling terrestrial RF signals comprising a plurality of UHF channels with a large variation in their respective power level.

According to a second aspect of the invention there is provided a method of operating the system according to any of the preceding claims comprising the steps of:
 each ADC converting the corresponding RF signal to the digitized RF signal;
 the digital multi-switch module selectively coupling each of the plurality of multi-switch outputs to a selected multi-switch input to output the corresponding selected digitized RF signal;
 each of the plurality of digital channelizers digitally modifying the selected digitized RF signal to the modified digital RF signal.

It is further clear that various further embodiments of the method according to the second aspect of the invention are possible in which corresponding method steps are present in which the features of the different embodiments of the system according to first aspect of the invention perform their function as for example defined in the dependent claims.

BRIEF DESCRIPTION OF THE DRAWINGS

FIG. 3 shows embodiments of the RF signal comprising the UHF frequency range comprising a plurality of UHF channels;

FIGS. 4A to 4F show embodiments of digital signals which clarify the operation of the digital channelizers and digital signal combiner of the embodiments of FIGS. 1 and 2.

DETAILED DESCRIPTION OF EMBODIMENT(S)

Figure 1:
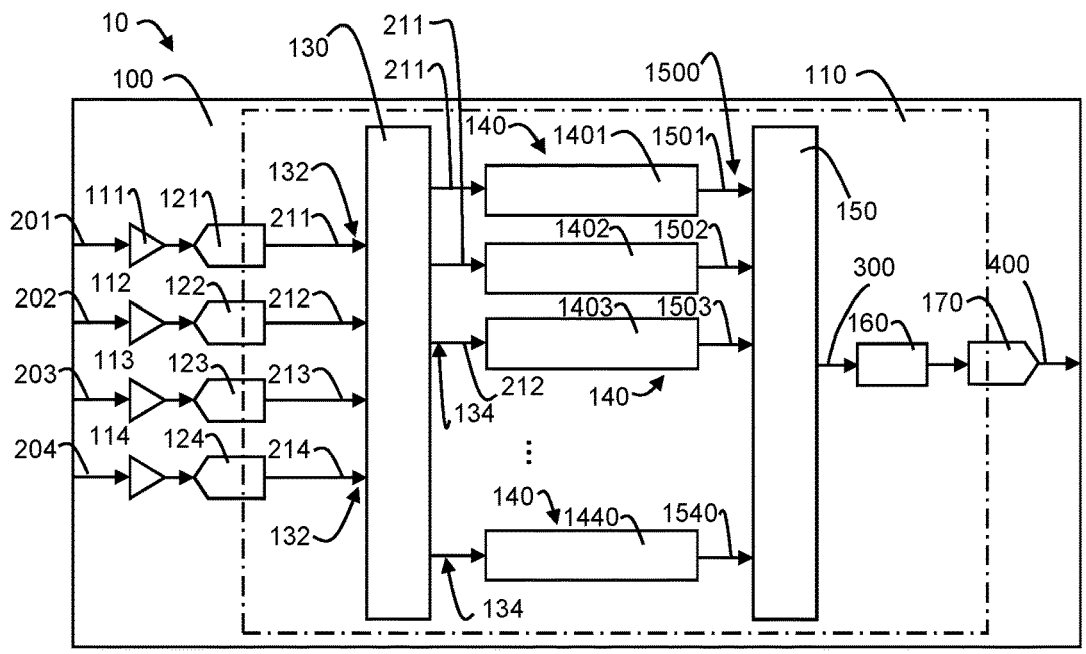
FIG. 1 shows an embodiment of the system according to the invention, which is for example embodied as a single chip component.

As shown, according to the embodiment of FIG. 1, system 10, could for example be embodied as, or comprise an integrated circuit 100, a single chip system, a system on a chip, etc. which integrates all components of the electronic system into a single chip. Such an embodiment is advantageous, as this reduces the signal paths and thereby for example reduces the level of signal attenuation, noise sensitivity, etc. Additionally the reduced number of components also increases robustness and simplicity of the circuit, increases quality and uniformity during production, and reduces the cost. However, it is clear that according to alternative embodiments, some of the components might be embodied as separate electronic components.

According to the embodiment shown, system 10 receives four radio frequency signals or RF signals 201, 202, 203, 204. It is however clear that according to alternative embodiments a different number of RF signals could be received by system 10, as long as in general the system 10 receives one or more, for example one, two, three, four, five or more, RF signals. As will be clear from the description below, the system 10 is particularly advantageous when receiving a plurality of RF signals, this means two or more RF signals. As will be explained in further detail below with reference to FIG. 2, according to this embodiment, these RF signals 201 to 204 are terrestrial RF signals received by a terrestrial antenna which have been transmitted over the air by one or more terrestrial transmission antenna, for example by a terrestrial television broadcasting service. Such a terrestrial RF signal could for example comprise a DVB-T signal or Digital Video Broadcasting-Terrestrial signal, which is the DVB European-based consortium standard for the broadcast transmission of digital terrestrial television that was first published in 1997; or a DVB-T2 signal or Digital Video Broadcasting-Second Generation Terrestrial signal, which is the extension of the television standard DVB-T, issued by the DVB consortium, for the broadcast transmission of digital terrestrial television. Digital Video Broadcasting or DVB is a suite of internationally accepted open DVB standards for digital television, which are maintained by the DVB Project, an international industry consortium, and are published by a Joint Technical Committee or JTC of the European Telecommunications Standards Institute or ETSI, European Committee for Electrotechnical Standardization or CENELEC and European Broadcasting Union EBU.

It is clear that terrestrial RF signals such as DVB-T or DVB-T2 in the context of this description are different from other signals originating from other sources than terrestrial radio frequency broadcasting services. RF signals origination from such other sources could for be satellite signals, such as for example DVB-S signals or Digital Video Broadcasting-Satellite signals according to the DVB standard for Satellite Television. Such satellite broadcasted RF signals typically are in a much higher frequency band than terrestrial RF signals. Satellite signals are for example in the typically broadcasted in the C-band 4-8 GHz, Ku-band 12-18 GHz, etc, while terrestrial RF signals comprise a UHF frequency range. The Ultra High Frequency range or UHF frequency range is defined by the ITU or International Telecommunication Union as the range between 300 MHz and 3 GHz. The UHF frequency range is defined by IEEE as 0.3 GHz to 1 GHz. However it is clear that in the context of this application, when referring to a terrestrial RF signal comprising terrestrial UHF signal, there is generally referred to a UHF frequency range which is lower than 1 GHz. In the context of this description, when in general referring to an RF signal comprising a UHF frequency range comprising a plurality of UHF channels, it is clear that this refers to embodiments similar as a terrestrial UHF signal, such as for example a terrestrial video broadcast signal, a terrestrial television broadcast signal, an analogue or digital terrestrial video broadcast signal, a DVB-T signal, a DVB-T2 signal, etc. which are operated worldwide in a UHF frequency range lower than 1 GHz, for example in the range of 470 MHz to 862 MHz. It is clear that alternative embodiments of terrestrial RF signals comprising alternative suitable frequency ranges are possible, such as for example a frequency range lower than 950 MHz or lower than 900 MHz. As generally known to the man skilled in the art such a UHF frequency range typically comprising one or more predetermined UHF channels. In the context of this description of terrestrial broadcasting services, such a UHF channel or UHF frequency channel is a designated radio frequency (or, equivalently, wavelength), assigned by a competent frequency assignment authority, such as for example the ITU, for the operation of a particular analog or digital terrestrial television, video, radio, etc. terrestrial broadcasting stations. A terrestrial antenna will typically receive such an RF signal comprising a UHF frequency range comprising a plurality of UHF channels with considerable variation in the signal level, quality, etc. for different UHF channels assigned to different terrestrial broadcasting stations, as the broadcasting power, transmission distance, signal interference, etc. might considerably vary for different terrestrial broadcasting stations. A terrestrial receiver antenna could for example be located at a distance of 5 km from a first terrestrial broadcasting station and at 50 km from a second terrestrial broadcasting station. When for example both terrestrial broadcasting stations transmit their respective UHF channels at the same signal power level, it is clear that there will be large relative differences in the power level of the received respective UHF channels at the terrestrial receiver antenna, because of the large relative difference in the transmission distance of the respective UHF channels. It is clear that the relative variation in transmission distance, signal path, etc. for respective signals received by a satellite dish from different satellite transponders is far lower than that of such different terrestrial UHF channels. It is thus clear that the relative difference in signal level of different channels in the received frequency band of a satellite signal will be much smaller than for the different channels of a terrestrial UHF frequency range.

As for example shown in FIG. 3, it is clear that alternative embodiments are possible for the RF signal comprising the UHF frequency range comprising a plurality of UHF channels. As shown in addition to the UHF frequency range the RF signal could for example also comprise a VHF frequency range comprising a plurality of VHF channels. As further shown, the RF signal in addition to the terrestrial UHF or VHF frequency range could for example also comprises an intermediate frequency or IF satellite signal, which was for example downconverted satellite signal to a frequency range of 950 MHz to 2150 MHz by means of a low noise block downconverter or LNB. However, it is clear that, in general, at least one of the RF signals 201, 202, 203, 204 received by the system 10 comprises a frequency range below 1 GHz comprising a plurality of UHF channels.

According to the embodiment shown in FIG. 1, the RF signal 201 received by the integrated circuit 100 of the system is fed to Analog to Digital Converter or ADC 121. As shown, preferably the RF signal 201 is amplified to the desired level by an automated gain control circuit or AGC 111. As shown, the ADC 121 converts the RF signal 201 received at its input in its entirety. It is clear that, in this way, the entire UHF frequency range comprising the plurality of UHF channels of the RF signal 201 received at the input of ADC 121 will be digitised by the ADC 121 and will be outputted by the ADC 121 as a digitized RF signal 211, which could also be referred to as a digital RF signal 211, comprising a digitized UHF frequency range, which could also be referred to as a digital UHF frequency range, comprising a plurality of digitized UHF channels, which could also be referred to as digital UHF channels. It is thus clear that, as shown, the RF signal 201 is digitised by its corresponding ADC 121 in its entirety to the digitized RF signal 211, which means that all UHF channels present in the RF signal 201 will also be present in the digitized RF signal 211. In this way the digitized RF signal 211 will thus comprise a digitized UHF frequency range comprising a plurality of digitized UHF channels, which corresponds to the UHF frequency range and the plurality of digitized UHF channels of the RF signal 201 before digitisation by the ADC 121. It will be clear that processing of the digitized RF signal 211 in the digital domain will preferably be performed by means of a digital signal processing part or module 110 of the integrated circuit 100 of the system 10. Preferably the ADC 121 converts the RF signal 201 to a digitized RF signal 211 at a sampling rate of for example 2 Gsps or more, for example 6 Gsps and with a resolution of 8 or more bits, for example 10 bits or 16 bits.

In the context of this application and more generally in the technical field of digital signal processing or DSP, the process of analog-to-digital conversion performed by an ADC produces a digital signal. A digital signal, such as for example the digitized RF signal, is a discrete-time signal for which not only the time but also the amplitude has discrete values. As generally known to a person skilled in the art the process of analog-to-digital conversion can typically be described as comprising a sampling step and a quantization step. The sampling step converts the continuous analog signal to a discrete-time signal comprising a sequence of samples, and the quantization step converts each sample of the sequence to a digital value. This digital value comprising for example an integer, floating point, fixed-point or any other suitable discrete digital value representative of the voltage or current of the sampled signal. It is clear that this digital value will be an approximation, for example by truncating or rounding, of the sampled signal to a finite and discrete set of quantization levels. For example, a digital signal comprising a sequence of 8-bit digital values comprises 256 quantization levels, 16-bit values comprise 65 536 quantization levels, etc. When for example ADC 121 converts the RF signal 201 with a sampling rate of 3 Gsps and with a resolution of 16 bits, this will result in digitized RF signal 211 obtained by sampling the continuous time signal at a sampling rate of 3 Gsps and by quantizing theses samples to 16-bit digital values. The digital signal, such as the digitized RF signal 211, thus represents a discrete-time signal comprising a sequence of digital values, representative of a sequence of samples at uniformly spaced times associated with the sampling rate of the ADC. As generally known to the man skilled in the art digital signal processing or DSP can be considered as the numerical manipulation of such digital signals. Although analysis, derivations, manipulations, etc. of such digital signals by means of digital signal processing methods, are typically based on discrete-time signal models, it is clear that there is also a frequency domain related to the time domain of such digital signals. As known to a person skilled in the art, a representation of this frequency domain of such a digital signal could for example be obtained by means of a Fourier transform, for example a discrete-time Fourier transform or DTFT. When, in the context of this description, there is made reference to concepts like a digital or digitized frequency range, digital or digital channels, etc. and/or digital signal processing operations like for example frequency translation, etc. it is clear that this relates to the corresponding frequency domain of such a discrete-time digital signal.

As further shown in FIG. 1, the digitized RF signal 211 outputted by ADC 121 is fed to an input of a digital multi-switch module 130. It is clear that the digital multi-switch module 130 is a digital component or module, for example part of a digital signal processing part 110 of the system 10. Such digital components or modules, although schematically represented and described as separate components and performing a function explained with reference to equivalent analog components, do not need to be embodied as separate hardware modules or components and could for example at least partly be realised by means of suitable software defined programs running on a processor capable of processing the digital values representing the digital signals, such as for example a digital signal processor. According to the embodiment shown the integrated circuit 100 could for example be embodied as an application specific integrated circuit or ASIC comprising such a digital signal processing module 110 with a suitable digital signal processor configured to run suitable digital signal processing algorithms. However, it is clear that alternative embodiments are possible in which the system digital signal processing part 110 comprises for example digital signal processing algorithms being executed by means of any type of suitable processor, field-programmable gate arrays of FPGAs, etc. As long as in general the digital signal processing part 110 processes digital signals, this means after the signals have been converted from analog signals to digital signals by an ADC and before being converted from digital signals back to analog signals by a digital to analog converter or DAC.

According to the embodiment shown, this digital multi-switch module 130 for example functions to provide the digital equivalent of a controllable collection of switches arranged in a matrix configuration, functionally equivalent to a crossbar switch, which establish a selective connection between any of the inputs and outputs of the matrix. According to the embodiment shown, the digitized RF signal 211 received at a multi-switch input 132 can be selectively coupled to any of the forty multi-switch outputs 134 of the digital multi-switch module 130. As shown in FIG. 1, the two top multi-switch outputs 134, which have been controlled to be selectively coupled to the multi-switch input 132 of the digitized RF signal 211, will output this selected digitized RF signal 211 at these multi-witch outputs 134. As shown, each of the forty multi-switch outputs 134 is coupled to a corresponding digital channelizer 140. This thus means that the forty corresponding digital channelizers 140 are each coupled to a single, corresponding multi-switch output 134. As further shown in FIG. 1, next to the multi-switch input 132 for the digitized RF signal 211 the digital multi-switch module 130 further comprises three further multi-switch inputs 132 for receiving three further digitized RF signals 212, 213, 214. Each of these three digitized RF signals 212, 213, 214 being generated in a similar way as described above with reference to the digitized RF signal 211 by means of a corresponding ADC 122, 123, 124 which digitizes a corresponding RF signal 202, 203, 204, preferably after levelling by means of a corresponding AGC 112, 113, 114. It is thus clear that each of the multi-switch inputs 132 is thus coupled to a corresponding ADC 121, 122, 123, 124. The shown embodiment of the system 10 thus comprises four ADCs 121, 122, 123, 124, and four corresponding multi-switch inputs 132. The output of each ADC being coupled to a single corresponding multi-switch input 132. According to the embodiment shown, the digital multi-switch module 130 thus functions as a 4×40 crossbar switch which can selectively couple any of its forty multi-switch outputs 134 to any of its four multi-switch inputs 132.

It is however clear that alternative embodiments are possible, as long as in general the digital multi-switch module 130 comprises one or more multi-switch inputs 132 and a plurality of multi-switch outputs 134. When for example the digital multi-switch module 130 comprises M multi-switch inputs 132 and N multi-switch outputs 134, it could function as a M×N crossbar switch. It is clear that in general, the one or more corresponding multi-switch inputs of the digital multi-switch module 130 are each coupled to a corresponding ADC for receiving a corresponding digitized RF signal. When for example there are N corresponding ADCs generating N corresponding digitized RF signals 211, 212, 213, 214, then the digital multi-switch will comprise N multi-switch inputs 132. It is further also clear that in general, the plurality of multi-switch outputs 134 are each configured to be selectively coupled to a selected multi-switch input 132 to output the corresponding selected digitized RF signal of this selected multi-switch input 132. It is further clear that, according to some embodiments, the number of multi-switch inputs 132 and corresponding ADCs corresponds to the number of RF signals received. According to the embodiments described with reference to FIG. 1, thus for each analog RF signal received by the system 10 there is one ADC converting this analog RF signal to a digitized RF signal and one multi-switch input 132 receiving this digitized RF signal from the ADC. For example, according to such embodiments, when the system 10 is configured to receive N RF signals 201, 202, 203, 204, it will comprise N ADCs 121, 122, 123, 124 and N multi-switch inputs 132. However it is clear, as will be described in more detail with reference to the embodiment of FIG. 6, that alternative embodiments are possible in which for example one or more of the ADCs receive an analog RF signal which was combined from a plurality of RF signals, such as for example a first RF signal comprising an UHF frequency range originating from a UHF antenna and a second RF signal comprising a VHF frequency range originating from a VHF antenna. It is clear that still further embodiments are possible, as long as in general a single RF signal is not split for reception by a plurality of the ADCs as this would lead to a decrease in the signal to noise ratio of such a split analog RF signal. This thus means that in general the one or more ADCs 121, 122, 123, 124 are configured to receive the one or more RF signals 201, 202, 203, 204 such that any of the RF signals is only received by a single ADC. This thus means that each ADC only receives an RF signal originating from a single antenna or a combined RF signal originating from a plurality of antennas. This also means that there is no plurality of ADCs which receives a split RF signal originating from the same antenna.

According to the embodiment shown in FIG. 1, the forty digital channelizers 140 are each coupled to a corresponding multi-switch output 134. Each digital channelizer 140 is coupled to a single multi-switch output 134. Thereby the digital channelizers 140 each receive the selected digitized RF signal presented at this multi-switch output 134 as selected by the digital multi-switch module 130. As shown, for example, digital channelizer 1401 receives the selected digitized RF signal 211, which was selected from the multi-switch input 132 receiving this digitized RF signal 211 from ADC 121. As further shown, for example, the second digital channelizer 1402 also receives a selected digitized RF signal 211 from its corresponding multi-switch output 134, which also was selected from the multi-switch input 132 receiving this digitized RF signal 211. A third digital channelizer 1403 receives a selected digitized RF signal 212 which was selected from the multi-switch input 132 receiving the digitized RF signal 212. It is clear that, by means of the digital multi-switch module 130, each digital channelizer 140 can respectively receive a selected digitized RF signal selected from any one of the digitized RF signals of any one of the ADCs and thus for any one of the RF signals received in their entirety by these ADCs. It is thus clear, that in the example shown, the forty digital channelizers are available for processing any set of forty selected digitized RF signals, selected from the four digitized RF signal 211, 212, 213, 214 by the digital multi-switch module 130. For example a set of selected digitized RF signals comprising 2 times digitized RF signal 211, 14 times digitized RF signal 212, 6 times digitized RF signal 213 and 10 times digitized RF signal 214. However it is clear that according to alternative embodiments not all four digitized RF signals should be present in the set, and the number of selected RF signals in the set could also be less than the maximum of forty. However, preferably the number of digital channelizers is larger than the number of ADCs as then the digital channelizers can be used for each RF signals received by the ADCs in a shared way and with greater flexibility. It is clear that still further alternative embodiments are possible, especially with respect to the number of ADCs corresponding to the number of received RF signals and the number of digital channelizers 140, however, in general, it is preferred that the digital multi-switch module 130 allows each of the ADCs to be selectively coupled to each of the plurality of digital channelizers 140 by means of the digital multi-switch module 130. According to alternative embodiments it is thus also clear that instead of four digitized RF signals mentioned above, one, two, three or more digitized RF signals are possible, and instead of forty channelizers, a different plurality of channelizers, such as for example ten, twenty, or more are possible, and that not all digitized RF signals should be present in the set of selected digitized RF signals, and that the number of selected RF signals in the set could also be less than the available number of channelizers.

The functional operation of the embodiment of the digital channelizers 140 shown will now be explained with reference to FIG. 4A to 4E. FIG. 4A shows an embodiment of the digitized RF signal 211 comprising a digitized UHF frequency range 2110 comprising a plurality of digitized UHF channels 2111 to 2114. As shown in FIG. 4B, digital channelizer 1401 which receives this selected digitized RF signal 211 and digitally modifies it to a modified digital RF signal 1501 by selecting a single desired digitized UHF channel 2114 from the selected digitized RF signal 211 and frequency translating this selected digitized UHF channel 2114 to a desired frequency associated with this digital channelizer 1401. As shown in FIG. 4C, digital channelizer 1402, which also receives selected digitized RF signal 211, modifies this selected digitized RF signal 211 to a modified digital RF signal 1502 by selecting a single desired digitized UHF channel 2112 and frequency translating it to a desired frequency associated with this digital channelizer 1402. FIG. 4D shows the digitized RF signal 212 comprising a digitized UHF frequency range 2120 comprising a plurality of digitized UHF channels 2121 to 2123. As shown in FIG. 4E, digital channelizer 1403, which receives this selected digitized RF signal 212, digitally modifies it to a modified digital RF signal 1503 by selecting and frequency translating the selected digitized UHF channel 2122 to a desired frequency. It is clear that, according to this embodiment, all forty digital channelizers 140 will operate in a similar way as explained above thereby producing forty modified digital RF signals 1501 to 1540 comprising a single selected digitized UHF channel, frequency translated to a respectively desired frequency. Preferably each digital channelizer 140 also adjusts the signal level of the selected digitized UHF channel to a desired level by subjecting the selected digitized UHF channel to a digital automatic gain control. According to a preferred embodiment, in this way, the signal level of all modified digital RF signals 1500 or the signal level of their corresponding selected digitized UHF channel, could be amplified in such a way that all signal levels are equalised to a predetermined desired level. This digital equalising of the signal level of the selected digitized UHF channels by means of the digital channelizers 140 is preferred as such a digital automatic gain control can be performed without significantly increasing the noise level of the signal and without requiring specific, analog low noise amplifiers, which are sensitive, expensive analog components which typically also lead to a higher level of power consumption. It is clear that still further alternative embodiments of the digital channelizers 140 are possible, as long as in general each digital channelizer 140 is configured to digitally modify the selected digitized RF signal 211, 212, 213, 214 to a modified digital RF signal 1500. According to such an alternative embodiment the digital channelizer 140 could for example only perform selection of one or more channels by means of a digital filter, without frequency translation. The use of the system 10, especially when comprising such an integrated circuit 100 as described above, for generating the modified digital RF signals 1500 from the one or more RF signals comprising a terrestrial RF signal is advantageous as this provides for a more efficient and flexible setup than known systems, especially when a plurality of such RF signals are involved, because the plurality of digital channelizers 140 can be used in a shared way for the plurality of RF signals.

According to the embodiment described above, selection of the desired digitized UHF channel from the digitized UHF frequency range of the digitized RF signal 211 could for example be performed by means of a suitable digital filtering operation. For example such a suitable filter could select a desired digitized UHF channel with a bandwidth of approximately 8 MHz by making use of a suitable filter matching this bandwidth. However, according to alternative embodiments, instead of selecting a single desired digitized UHF channel, each channelizer could select two or more desired digitized UHF channels from the UHF frequency range of the digital signal. This could for example be realised by means of a suitable filter to select a subset of the digitized frequency range, comprising the desired plurality of UHF channels, for example a filter suitable for filtering N times the bandwidth associated with a UHF channel, such as for example a filter selecting 64 MHz from the digitized UHF frequency range comprising eight desired UHF channels with bandwidth of approximately 8 MHz. In general, this thus means that the plurality of digital channelizers 140 is configured to modify the selected digitized RF signal 211, 212, 213, 214 such that the modified digital RF signal 1500 comprises one or more selected digitized UHF channels, selected from the plurality of digitized UHF channels of the selected digitized RF signal 211, 212, 213, 214.

According to the embodiment described above, frequency translation by a digital channelizer of a selected UHF channel refers to positioning the selected UHF channel at a desired frequency in the modified digital RF signal 1500 of the digital channelizer, similar as described above. However this does not mean that this should be performed by means of a single digital signal processing operation. For example, the digitized RF signal could for example be subjected to a sequence of digital signal processing operations such as digital down conversion from the UHF channel to baseband or a suitable intermediate frequency and subsequently to digital up conversion from the downconverted selected UHF channel to the desired frequency for the modified RF signal outputted by the channelizer. Digital down and/or up conversion of the digital signal, then combine into a digital signal processing operation that translates the frequency of the one or more selected UHF channel from their frequency in the selected digitized RF signal received by the digital channelizer to the desired frequency in the modified digital RF signal outputted by the digital channelizer. It is clear that in the context of this description, when referring to a channel and frequencies associated with such a channel, this is to be interpreted as for example a reference to a UHF channel and the associated carrier frequencies for carriers comprising for example digital content, such as for example video, audio, data or any suitable combination. It is thus clear, when there is referred to an analog RF signal in the context of this description, that this refers to an RF signal in the analog domain, before it is digitized by means of an ADC to a digital RF signal or digitized RF signal. It is thus clear that such an analog RF signal could comprise channels comprising any suitable content, both in analog or digital form. It is thus clear that this analog RF signal could comprise one or more channels comprising content in the form of a digital signal. Such an analog RF signal could for example comprise one or more channels comprising content in the form of a terrestrial digital video broadcast signal, such as for example a DVB-T or a DVB-T2 signal. It is clear that such a channel itself typically occupies a bandwidth of several megahertz and that during digital signal operations such as for example frequency translation as described above the bandwidth of such a channel is not changed. Although the examples above relate to a digitized RF signal comprising a plurality of UHF channels in a UHF frequency range, it is clear that according to alternative embodiments, in a similar way the concepts described above could also be applied to a digitized RF signal comprising a plurality of VHF channels in a VHF frequency range. The Very High Frequency or VHF range is the International Telecommunication Union or ITU designation for the RF frequency range from 30 MHz to 300 MHz, immediately below the UHF frequency range and is commonly used for radio broadcasting, television broadcasting, etc. As generally known to a person skilled in the art, predetermined frequencies have been assigned to broadcast television VHF and UHF channels in various regions of the world for broadcasting by means of terrestrial RF signals. Such UHF or VHF channels of such an RF signal can for example also be referred to by means of a standardised International Telecommunication Union or ITU letter designator associated with the particular system used for generating the RF signal. When for example a selected digitized UHF or VHF channel of a digitized RF signal is frequency translated by means of the digital channelizer 140 to a desired frequency in the modified digital RF signal, this could for example mean that the selected channel frequency translated such that its ITU letter designator is modified to a desired ITU letter designator. However, it is clear that still further alternative embodiments are possible, in which the one or more selected channels of a frequency range lower than 1 GHz of a RF signal are frequency translated in a similar way as described above by the digital channelizer. In this way, when reference is made to concepts like a UHF frequency range, UHF channel, etc. in the context of this description, according to alternative embodiments these concepts could be replaced by a VHF frequency range, VHF channel, etc. or a frequency range below 1 GHz, channels comprised in this frequency range below 1 GHz, etc.

As further shown, according to the embodiment of FIG. 1, the system 10 further also comprises a digital signal combiner 150. As shown, the digital signal combiner 150 is coupled to the plurality of digital channelizers 140. According to the embodiment shown the digital signal combiner 150 receives the forty modified digital RF signals 1501 to 1540 from the forty digital channelizers 1401 to 1440. The digital signal combiner 150 then combines these forty modified digital RF signals 1501 to 1540 to a combined modified digital RF output signal 300. As shown, in FIG. 4F, this means that the combined modified digital RF output signal 300 will for example comprise a set of the forty selected, frequency translated and leveled digitized UHF channels of the corresponding forty modified digital RF signals 1501 to

1540. It is however clear that alternative embodiments are possible, as long as in general the digital signal combiner 150 receives the plurality of corresponding modified RF signals 1500 from the corresponding plurality of digital channelizers 140 and the digital signal combiner 150 is configured to combine the plurality of modified digital RF signals 1500 into a combined modified digital RF output signal 300.

As further shown in FIG. 1, according to this embodiment, the combined modified digital RF output signal 300 is provided by the digital signal combiner 150, preferably via digital signal output processing module 160 to a Digital to Analog Converter or DAC 170. The optional digital signal output processing module 160 provides for final optimizations or additions to the combined modified digital RF output signal 300 in the digital domain, for example by means of digital signal processing operations such as filtering, inverse sin(x)/x filtering, compression, noise removal, etc. The DAC 170 converts the combined modified digital RF output signal 300 which is a digital signal to a modified RF output signal 400 which is an analog signal. It is clear that in this way system 10 has generated the modified RF output signal 400 such that it comprises a modified set of selected UHF channels from the one or more RF signals 201, 202, 203, 204 received by the system 10. It should be clear that the digital-to-analog converter or DAC 170 is the component of the system 10 which functions to convert the digital signal generated by the digital signal processing part 110 of the system 10 back into an analog signal. Although according to the embodiment shown in FIG. 1, the DAC 170 is represented as an integral component of the integrated circuit 100, it could alternatively be embodied as a separate component or module of the system 10. It is clear that numerous further alternative embodiments are possible, in which for example the digital signal processing part 110 is distributed along a plurality of digital signal processing modules, which could optionally be integrated with one or more components such as the ADC or DAC of the system 10. For example according to one exemplary embodiment the system 10 could comprises a first component comprising the ADCs, the digital multiswitch and a downconversion part of the digital channelizers, etc.; and a second component coupled to this first component in suitable way that allows exchange of digital signals, which for example comprises an upconversion part of the digital channelizers the digital signal combiner 150, digital signal output processing module 160, and DAC 170.

Figure 5:
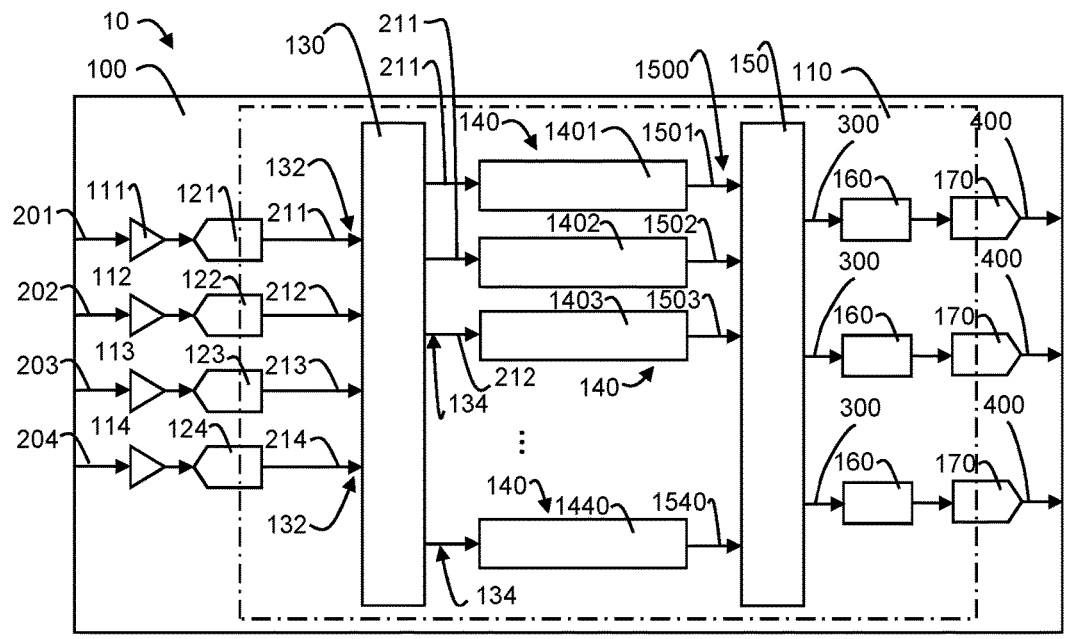
FIGS. 5 and 6 show alternative embodiments to the respective embodiments of FIGS. 1 and 2.

Although FIG. 1 shows an embodiment comprising a combined modified digital RF output signal 300, as shown in FIG. 5, alternative embodiments are possible in which a plurality of such digital RF output signals 300 are generated. The embodiment of FIG. 5 corresponds largely to that of the embodiment of FIG. 1 and similar elements have been identified by means of similar references and generally function in a similar way as described above. According to the embodiment shown in FIG. 5, the digital signal combiner 150 functions similar as described above, however it is now able to provide three desired combinations of the plurality of modified digital RF signals 1500 as three combined modified digital RF output signals 300. These three combined modified digital RF output signals 300 can then respectively be provided via three digital signal output processing module 160 to three DACs 170 for generating three respectively modified RF output signals 400. It is clear that still further alternative embodiments are possible as long as in general the digital signal combiner 150 is coupled to the plurality of digital channelizers 140 in such a way that the digital signal combiner 150 receives the plurality of corresponding modified RF signals 1500 and combines these plurality of modified digital RF signals 1500 into one or more combined modified digital RF output signals 300. These one or more modified digital RF output signals 300 then respectively being received by one or more DACs 170 coupled to the digital signal combiner 150 for respectively converting them to one or more corresponding modified RF output signals 400. It is clear that in this way each of the modified RF output signals 400 will comprise a desired modified set of selected channels from the RF signals received by the system 10.

Figure 2:
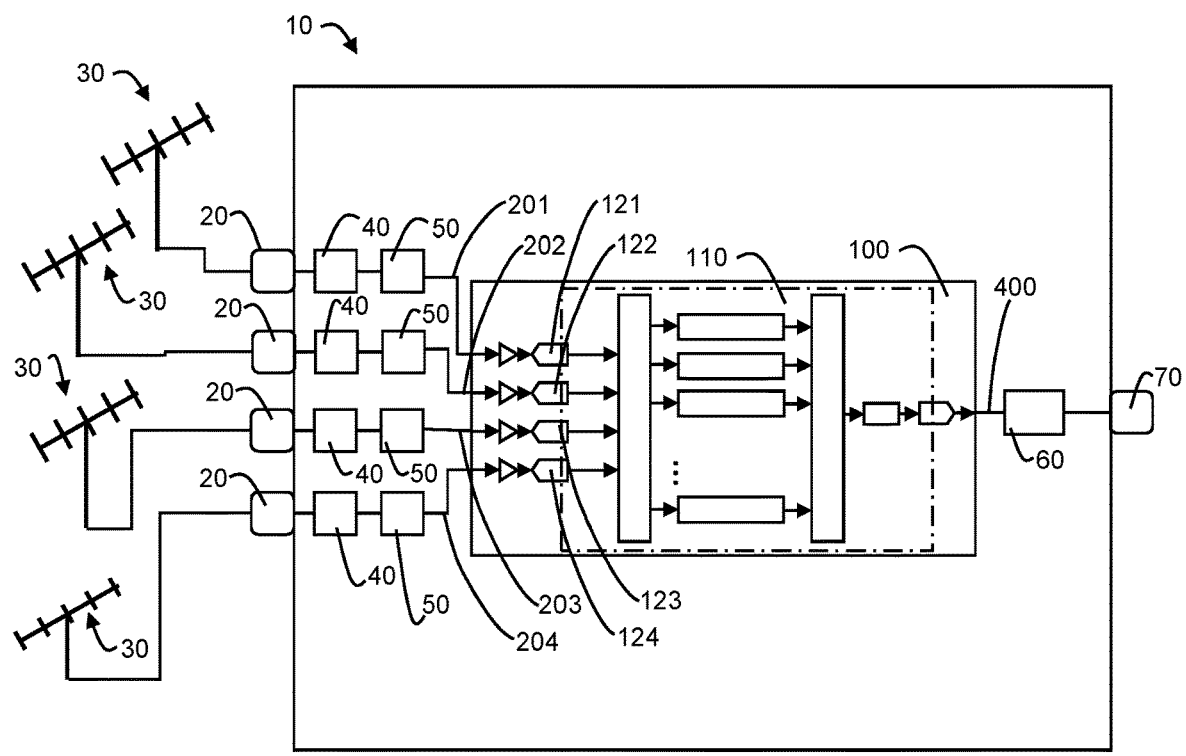
FIG. 2 shows a further embodiment of the system comprising components similar to that shown in FIG. 1 supplemented with additional components.

FIG. 2 shows an alternative embodiment of the system 10 which comprises an integrated circuit 100, similar as discussed with reference to the embodiment of FIG. 1. Similar elements function generally in a similar way as described above and have been provided with similar references. As shown, similar as explained above, the integrated circuit 100 receives four RF input signals 201 to 204 and generates a modified RF output signal 400 comprising modified set of selected UHF channels from the received RF signals 201 to 204. As shown in FIG. 2, in addition to the integrated circuit 100 this embodiment of the system 10 comprises some further optional components in the signal path of the RF signals 201 to 204 and in the signal path of the modified RF output signal 400, which will be described in more detail below. As shown, according to this embodiment, the system 10 comprises four input connectors 20. Each of these four input connectors 20 is configured to receive a terrestrial RF signal from a terrestrial antenna 30. It is clear that each input connector 20 is coupled to a single corresponding ADC 121, 122, 123, 124 of the integrated circuit 100. Although, as shown, some components 40, 50 may be present in the signal path from the input connector 20 to the corresponding ADC, it must be clear that the RF signals 201 to 204 are received by the ADCs 121 to 124 in such a way that a single ADC receives a single RF signal. According to the embodiment shown, the RF signals 201 to 204 for example comprise the UHF frequency range comprising the plurality of UHF channels as received by the respective terrestrial antenna 30. According to the embodiment shown, the components in the signal path of the terrestrial RF signal 201 between the input connector 20 and the corresponding ADC 211 are for example a controllable RF filter 40 and a low noise preamplifier 50. It is clear that such components operate in such a way that the RF signal 201 received from one input connector 20 is only provided to a single ADC 211. According to this embodiment, this for example means that the RF signal 211 is received at its corresponding ADC while still comprising its UHF frequency range and the plurality of UHF channels received by the antenna 30. It is clear that according to alternative embodiments other components may be inserted in the analog signal path of the RF signal between the input connector of the system 10 and the ADC, such as for example an automatic gain control module, etc. as long as these components function in such a way that an analog signal received by an input connector 20 is not provided to more than one ADC. Additionally this means that none of the components operate in such way that frequency translation operations are performed on the channels in an analog signal path to a plurality of ADCs, for example in order to provide different channels of the frequency range of the analog signal at the input of different ADCs. This for example means that there is not arranged a power splitter, a frequency translation module, etc. in the signal path of the terrestrial RF signal between the input connector 20 and its corresponding ADC, nor any other components or combination of components that would cause the RF signal, its UHF frequency range, and its UHF channel set to be split and received by more than one ADC. By digitising the analog RF signal received at the input connector as described above, the number of components in the analog signal path between the input connector for the terrestrial antenna and the ADC is reduced. This minimizes the risk for increasing the noise level. Additionally as each analog signal is not provided to more than one ADC and there is not made use of inflexible analog components like signal splitters and frequency translation modules in its signal path, this increases the flexibility as the digitized RF signals can subsequently be subjected to more flexible digital processing as explained above with reference to FIG. 1, in which for example the digital channelizers can be used in a shared way for any desired RF signal received or outputted by the system, by means of the digital multi-switch 130 and/or the digital signal combiner 150. Additionally the configuration of the digital channelizers can be changed or upgraded by means of for example software upgrades, which is more flexible than corresponding hardware reconfiguration operations. As further shown in FIG. 2, the modified RF output signal 400 could for example be subjected to a final stage of amplification by means of a UHF power amplifier 60 before being fed to an output connector 70 of the system 10.

Figure 6:
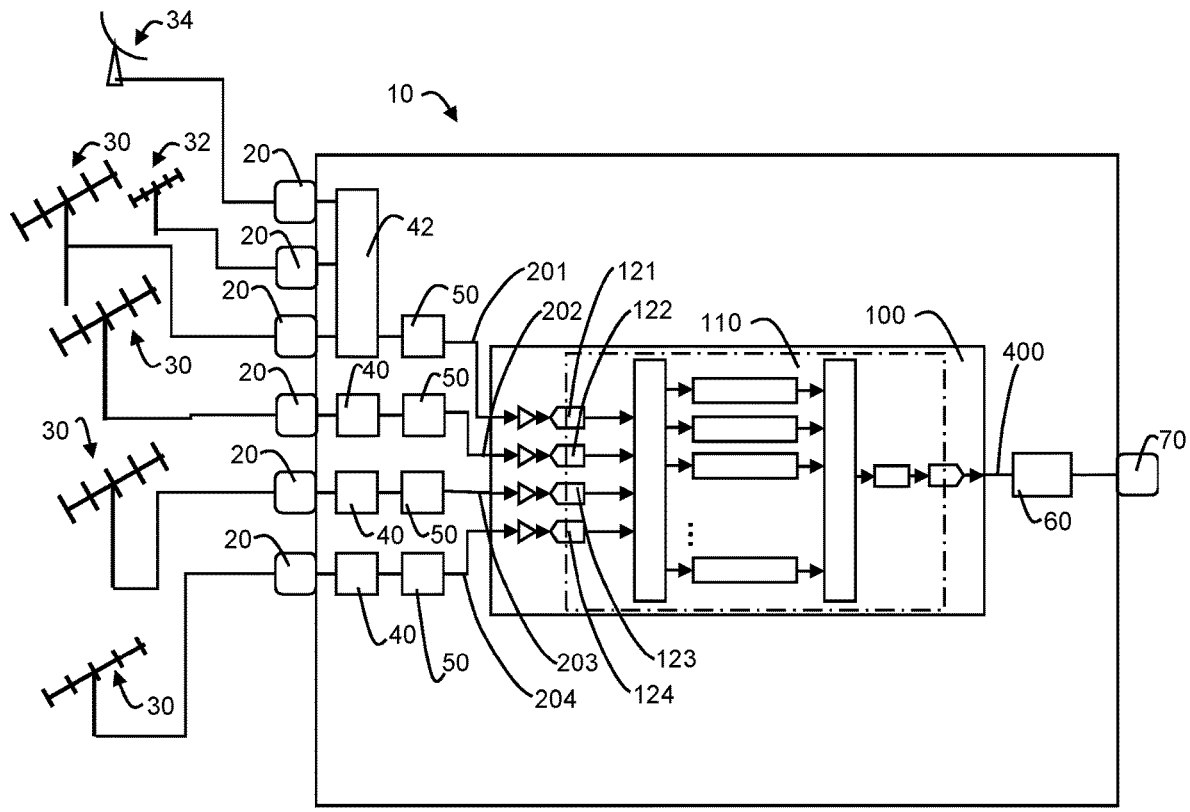

Still a further alternative embodiment is schematically shown in FIG. 6. The embodiment of FIG. 6 is similar to that of FIG. 2 and similar elements have been provided with similar references and generally function in a similar way as described above. As shown, different from FIG. 2, the RF signal 201 received by the ADC 211 embodiment comprises, similar as described with reference to the embodiment of FIG. 3, in addition to a terrestrial RF signal comprising an UHF frequency range, also a VHF frequency range and an IF satellite signal. As shown according to this embodiment the RF signal 201 is the result of a combination of the RF signal received at three different input connectors 20 of the system 10. A first input connector 20 receives a terrestrial RF signal comprising a UHF frequency range comprising a plurality of UHF channels from a terrestrial UHF antenna 30. A second input connector 20 receives a terrestrial RF signal comprising a VHF frequency range comprising a plurality of UHF channels from a terrestrial VHF antenna 32. A third input connector 20 receives an IF satellite signal from the LNB of a satellite dish 34. The signals of these three input connectors 20, as shown, are for example combined by means of an analog signal combiner 42 in such a way that their respective frequency ranges do not overlap. As further shown, according to this embodiment, this combined signal is subsequently provided via a low noise preamplifier 50 to the ADC 211 as the combined RF signal 201. It is clear that still further embodiments are possible in which any suitable variation of and number of combined RF input signals is provided to the ADCs, as long as in general each RF signal, whether such a combined RF signal or not, is not provided to more than on ADC. It is thus clear that, although in the embodiments described above, there is made reference to a digitized RF signal comprising a digitized UHF frequency range with a plurality of digitized UHF channels, in general alternative embodiments are possible in which the digitized RF signal comprises a digitized frequency range, which could also be referred to as a digital frequency range, with a plurality of digitized frequency channels, which could also be referred to as digital frequency channels, which generally correspond to a frequency range below 1 GHz comprising a plurality of frequency channels with a bandwidth below 10 Mhz of a corresponding analog RF signal as digitised by a single ADC as described above. According to still further embodiments, in addition to the input connectors mentioned above for the analog terrestrial RF signals comprising a frequency range below 1 GHz, the system could comprise additional input connectors for receiving other types of input signals, such as for example satellite signals, cable signals, etc, which could optionally also be digitized in such a way that these additional analog signals are only received by a single ADC, and subsequently similarly fed to the digital multi-switch module and the plurality of digital channelizers, etc. as described above for the terrestrial RF signals.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system configured to receive, from one or more antennas, one or more radio frequency signals comprising a UHF frequency range comprising a plurality of UHF channels, the system comprising:
   one or more corresponding analog to digital converters configured to receive said one or more RF signals such that any of the RF signals is only received by a single ADC, each ADC configured to convert the corresponding RF signal to a digitized RF signal such that it comprises a digitized UHF frequency range comprising a plurality of digitized frequency channels corresponding to a plurality of the UHF channels;
   a digital multi-switch module comprising:
   one or more corresponding multi-switch inputs each coupled to a corresponding ADC and configured to receive a corresponding digitized RF signal; and
   a plurality of multi-switch outputs, each configured to be selectively coupled to a selected multi-switch input to output the corresponding selected digitized RF signal;

a plurality of digital channelizers, each digital channelizer coupled to a single multi-switch output and configured to digitally modify the selected digitized RF signal to a modified digital RF signal.

2. The system according to claim 1, wherein:

the one or more RF signals further comprise a terrestrial RF signal comprising a frequency range below 1 GHz comprising a plurality of frequency channels with a bandwidth below 10 MHz; and in that each ADC is configured to convert the corresponding RF signal to a digitized RF signal such that it further comprises a plurality of digitized frequency channels corresponding to a plurality of said frequency channels with a bandwidth below 10 MHz;

the terrestrial RF signal preferably comprising one or more of the following:

a terrestrial VHF signal;

a terrestrial UHF signal;

a terrestrial video broadcast signal;

a terrestrial television broadcast signal;

a terrestrial digital video broadcast signal;

a DVB-T or DVT-T2 signal.

3. The system according to claim 1, wherein each of the plurality of digital channelizers is configured to modify the selected digitized RF signal such that the modified digital RF signal comprises one or more selected digitized frequency channels, selected from the plurality of digitized frequency channels of the selected digitized RF signal.

4. The system according to claim 1, wherein each of the plurality of digital channelizers is configured to modify the selected digitized RF signal such that the modified digital RF signal comprises a single selected digitized frequency channel, selected from the plurality of digitized frequency channels of the selected digitized RF signal.

5. The system according to claim 3, wherein each of the plurality of digital channelizers is further configured to frequency translate its one or more selected digitized frequency channels.

6. The system according to claim 3 wherein each of the plurality of digital channelizers is configured to subject its one or more selected digitized frequency channels to digital automatic gain control.

7. The system according to claim 1, wherein the system further comprises a digital signal combiner coupled to the plurality of digital channelizers such that the digital signal combiner receives the plurality of corresponding modified RF signals, the digital signal combiner configured to combine the plurality of modified digital RF signals into one or more combined modified digital RF output signals.

8. The system according to claim 7, wherein the system further comprises one or more digital to analog converters coupled to the digital signal combiner, and each configured to receive one combined modified digital RF output signal and convert it to a combined modified RF output signal.

9. The system according to claim 8, wherein each combined modified RF output signal comprises a modified set of selected UHF channels from the one or more RF signals.

10. The system according to claim 1, wherein the number of digital channelizers is larger than the number of ADCs.

11. The system according to claim 1, wherein the digital multi-switch module is further configured such that each of the ADCs is selectively couplable to each of the plurality of digital channelizers by means of the digital multi-switch module.

12. The system according to claim 1, wherein the system further comprises one or more input connectors, each input connector configured to receive the RF signal from the antenna, and each input connector being coupled to only one ADC.

13. The system according to claim 12, wherein there is arranged in the signal path of the RF signal between the input connector and the corresponding ADC, one or more of the following:

a filter;

a low noise amplifier;

an automatic gain control module.

14. The system according to claim 13 wherein there is not arranged in the signal path of the terrestrial RF signal between the input connector and the corresponding ADC, one or more of the following:

a power splitter configured to distribute a single terrestrial RF signal to two or more of the ADCs;

a frequency translation module.

15. A method of operating the system according to claim 1 comprising the steps of:

each ADC converting the corresponding RF signal the digitized RF signal;

the digital multi-switch module electively coupling each of the plurality of multi-switch outputs to a selected multi-switch input to output the corresponding selected digitized RF signal;

each of the plurality of digital channelizers digitally modifying the selected digitized RF signal to the modified digital RF signal.

* * * * *